United States Patent [19]
Ott et al.

[11] Patent Number: 5,436,994
[45] Date of Patent: Jul. 25, 1995

[54] FERRULE HOLDER FOR FIBER OPTIC CONNECTOR

[76] Inventors: Conrad L. Ott, 43 Washburn St., Lake Grove, N.Y. 11755; Michael Fasano, 6 Sweethollow Rd., Huntington, N.Y. 11743; David E. Wuestmann, 52 Hasting Dr., Fort Salonga, N.Y. 11768; Peter Tabone, 73 Ave. A, Kings Park, N.Y. 11754; Carl E. Meyerhoefer, 27 Stonywell Ct., Dix Hills, N.Y. 11746

[21] Appl. No.: 23,678

[22] Filed: Feb. 26, 1993

[51] Int. Cl.⁶ .......................... G02B 6/00; G02B 6/36
[52] U.S. Cl. ..................................................... 385/86
[58] Field of Search ................. 385/78, 79, 80, 86, 385/60, 58, 69, 62, 81

[56] References Cited
U.S. PATENT DOCUMENTS

| | | | |
|---|---|---|---|
| 3,684,321 | 8/1972 | Handhausen et al. | 385/76 |
| 4,699,456 | 10/1987 | Mackenzie | 385/86 X |
| 4,773,725 | 9/1988 | Ashman et al. | 385/78 X |
| 4,812,009 | 3/1989 | Carlisle et al. | 385/69 X |
| 4,892,380 | 1/1990 | Mori | 385/58 |
| 4,964,685 | 10/1990 | Savitsky et al. | 385/58 |
| 4,964,690 | 10/1990 | Lappöhn et al. | 385/58 |
| 5,058,984 | 10/1991 | Bulman et al. | 385/80 |
| 5,096,276 | 3/1992 | Gerace et al. | 385/76 |
| 5,136,672 | 8/1992 | Mulholland et al. | 385/53 |
| 5,146,525 | 9/1992 | Tabone | 385/78 |
| 5,181,267 | 1/1993 | Gerace et al. | 385/80 X |

*Primary Examiner*—Akm E. Ullah

[57] ABSTRACT

An improved fiber optic connector of the type in which a fiber supporting ferrule is slidably and resiliently biased independently of the surrounding load-bearing parts of the connectors so that forces applied to the fiber optic cable jacket are not transmitted to the ferrule and supported fiber to interrupt communications then in progress. The connector is substantially fully assembled prior to interconnection with the cable, and requires the introduction of an epoxy or other suitable adhesive to secure the fiber within the ferrule which is provided by a syringe. The needle of the syringe is inserted into a positioning tube which confines the adhesive to the needed area, and prevents wicking of the adhesive to surrounding areas where it might interfere with the sliding action of the ferrule. It also wipes the needle of adhesive as it is withdrawn. A rear body element of the connector is provided with internal threads which surround the cable jacket, which, during a crimping operation, causes the jacket to deform into the threads for superior cable retention. A buffer protection tube is provided which is inserted onto the end of the cable between the buffer and the load-bearing strands to serve the dual purposes of spreading the load-bearing fibers evenly, and protecting the buffer against radial compression so that it remains free to move axially within the jacket.

5 Claims, 7 Drawing Sheets

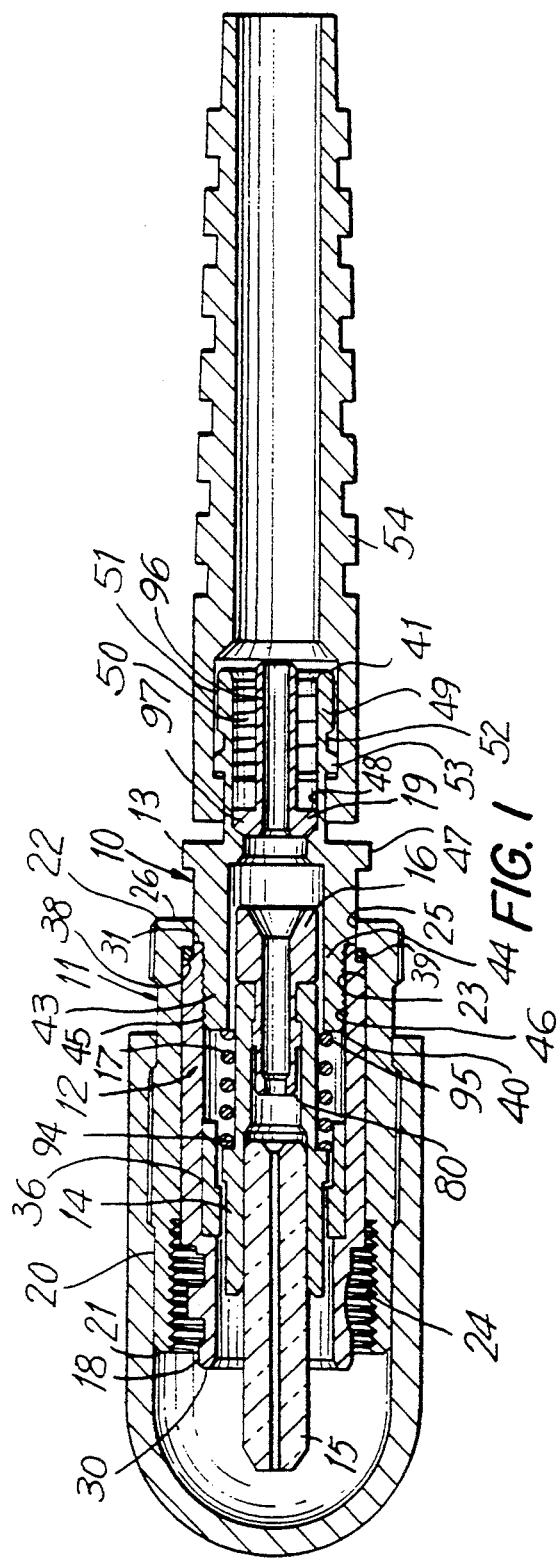
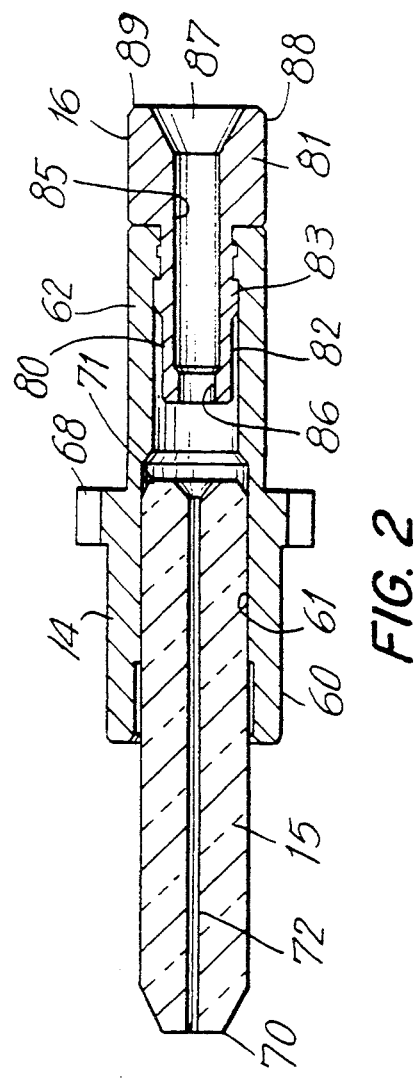
FIG. 1
FIG. 2

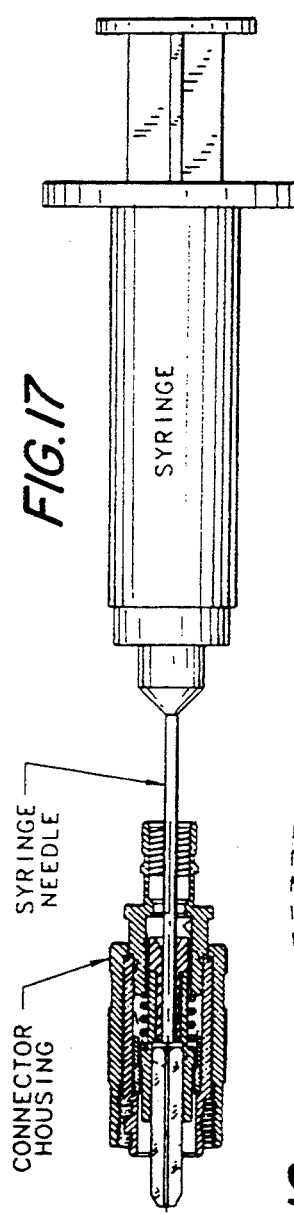
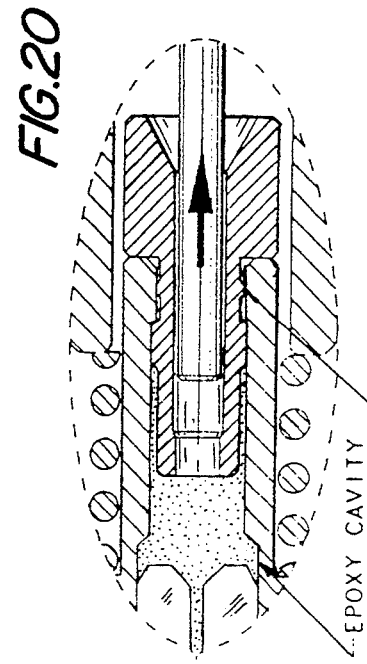
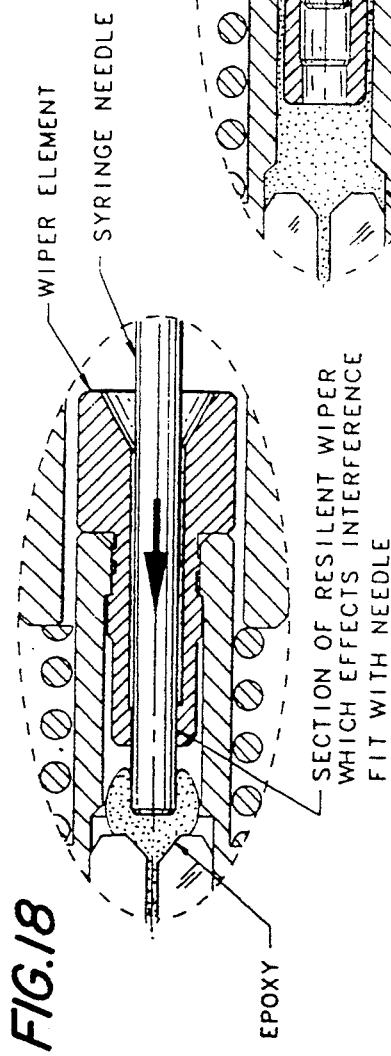
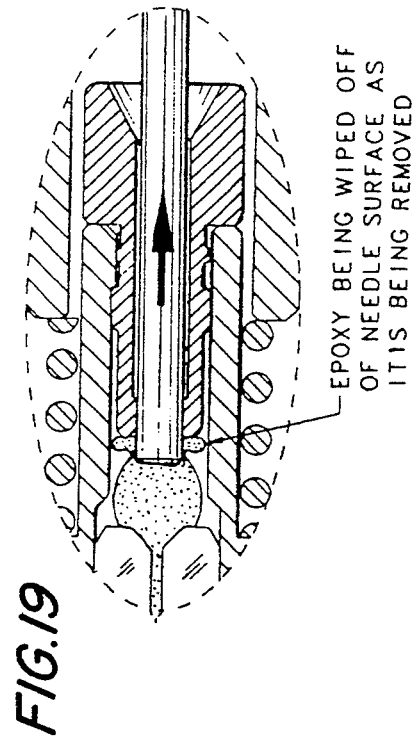

FERRULE HOLDER FOR FIBER OPTIC CONNECTOR

BACKGROUND OF THE INVENTION

This invention relates generally to the field of optical cable connectors used in the telecommunications industry, and more particularly to a type in which the fiber optic core and surrounding cladding or buffer are supported in a slidably mounted ferrule to enable relative movement between the core and buffer and the surrounding jacket of the cable which forms a load supporting part of the cable. This type of construction has come into increased use in recent years because of the ability to absorb external loads on the cable without disturbing the positioning of the end of the fiber, movement of which would otherwise interfere with a transmitted communication carried by the cable.

Connectors of this type are normally substantially fully assembled before permanent engagement with the end of the cable, which installation involves the adhesion of the fiber within the ferrule and the simultaneous cementing of the ferrule to a ferrule-supporting body. Care must be exercised to prevent any wicking of the adhesive to other parts of the connector so that the ferrule body will not be frozen in a single position when the adhesive cures. In one known device of this type, an elongated flexible sleeve is provided which communicates at an inner end thereof with the inner end of the ferrule, and in which the outer end extends outwardly of the connector to be severed after the epoxy has been injected therethrough. While effective, this construction requires an additional manufacturing operation, and is somewhat clumsy in operation.

Another problem occurs with the clamping of the rear part of the connector upon the outer jacket of the cable. The clamping action must be secure, but not include the clamping of the buffer or cladding which must be capable of limited axial movement within the jacket as is required with a floating ferrule construction.

One form of connector of this type also requires the use of an external key which engages a corresponding recess in a mating adapter. The free end of the key normally projects forwardly to a point where it interferes with the polishing of the finished end of the cable. In this type of connector, a key body includes a bore having internal keys which are not easily formed by machining operations, thus significantly adding to the cost of manufacture.

SUMMARY OF THE INVENTION

Briefly stated, the invention contemplates the provision of improved fiber optic connectors of the class described, in which the above-mentioned disadvantages and requirements have been substantially addressed and complied with.

To this end, three of the disclosed devices include an internal guide forming a bore which accommodates the diameter of the needle of the syringe employed in injecting the adhesive in such manner that not only is the flow of adhesive outside the desired area avoided, but the needle itself is wiped free of adhesive as it is withdrawn, and then acts as a guide for the subsequent insertion of the fiber into the ferrule. The rear body of the connector which engages the jacket of the cable may take any of several alternative forms, one of which includes a collet type clamp which grips the jacket firmly without restraining the buffer. Another form includes the provision of internal threads in the rear body into which the outer surface of the jacket is deformed upon crimping. In this case, the buffer is protected from being restrained by the provision of a metal tube which is inserted between the buffer and the surrounding strength members which isolates the buffer from the crimping action. Installation of the cable within the connector, in one embodiment, is simplified by providing a selectively removable external key. In all disclosed embodiments, manufacturability is facilitated by effecting an internal key within the key body which is separately formed and press-fitted within a bore in the body.

BRIEF DESCRIPTION OF THE DRAWINGS

In the drawings, to which reference will be made in the specification, similar reference characters have been employed to designate corresponding parts throughout the several views.

FIG. 1 is a longitudinal central sectional view of a first embodiment of the invention.

FIG. 2 is a longitudinal central sectional view of a subassembly of the embodiment including a ferrule, a ferrule supporting body, and an epoxy needle wiping member.

FIG. 17 is a sectional view, partly in elevation showing the injection of an epoxy adhesive into the structure shown in FIG. 1.

FIG. 18 is an enlarged fragmentary sectional view showing the filling of a space adjacent the end of a ferrule with epoxy adhesive.

FIG. 19 is a similar enlarged fragmentary sectional view showing the removal of a syringe needle after the depositing of the epoxy adhesive.

FIG. 20 is a similar enlarged fragmentary sectional view showing the wiping action of the structure upon the syringe needle as the same is withdrawn.

DETAILED DESCRIPTION OF THE DISCLOSED EMBODIMENTS

Figure 3:
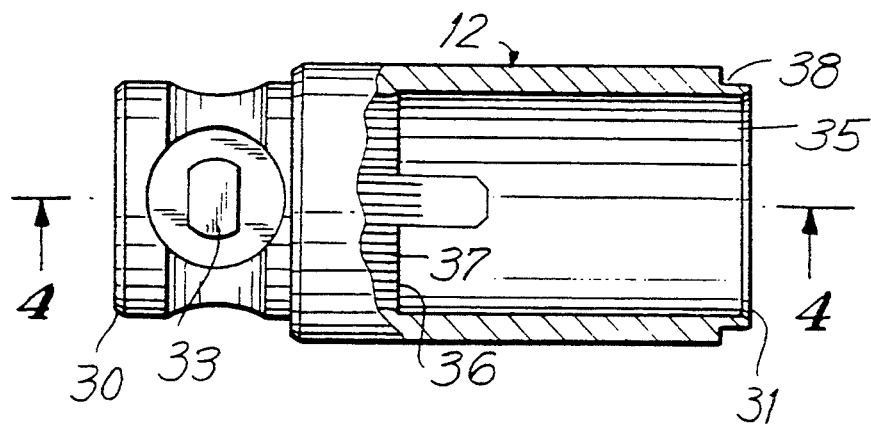
FIG. 3 is a view in elevation, partly in section, of a key body assembly.
Figure 4:
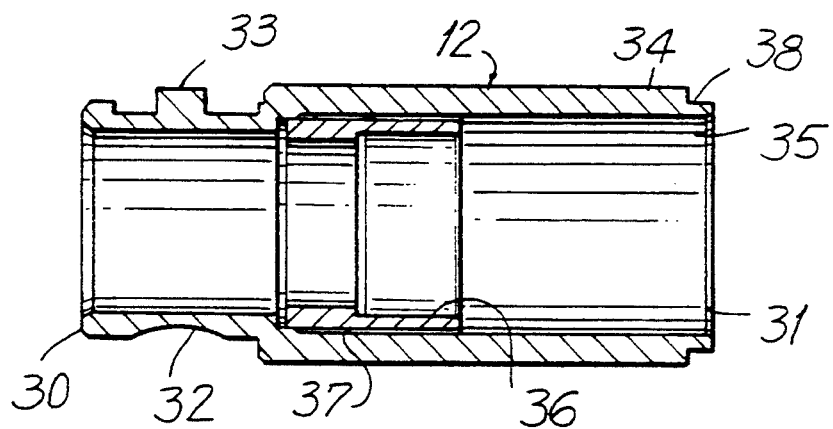
FIG. 4 is a longitudinal central sectional view thereof as seen from the plane 4—4 in FIG. 3.
Figure 5:
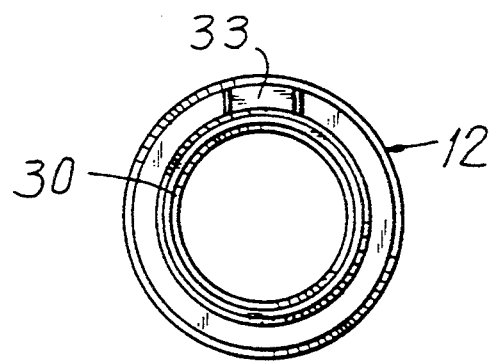
FIG. 5 is an end elevational view thereof, as seen from the left-hand portion of FIG. 4.
Figure 6:
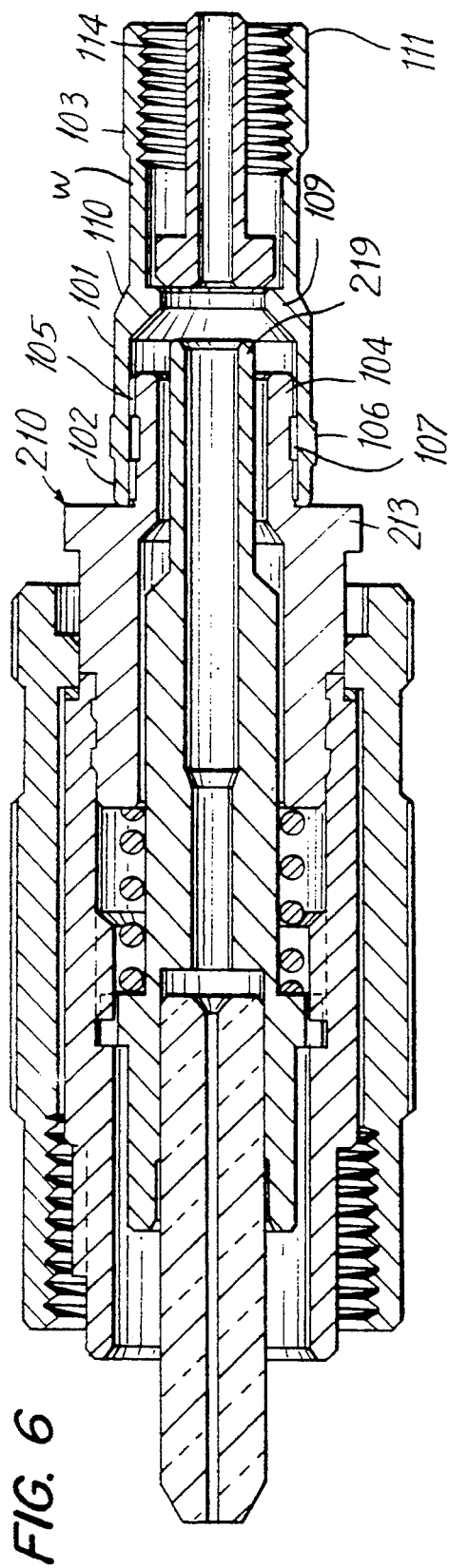
FIG. 6 is a longitudinal central sectional view of a second embodiment of the invention.

In accordance with the first embodiment of the invention, the device, generally indicated by reference character 10 (FIGS. 1 and 2) comprises broadly: a coupling sleeve element 11, a key body element 12, a rear body element 13, a ferrule supporting body 14, a ferrule 15, a syringe needle engaging element 16, referred to hereinafter as a wiper, a ferrule body spring 17, a protective cap 18, and a buffer protective tube member 19.

The coupling sleeve element 11 is generally conventional, and is bounded by an outer surface 20 extending from a first end 21 to a second end 22. An interior bore 23 includes a partially threaded segment 24 which engages a corresponding part on a known adapter (not shown). A through bore 25 and an end wall 26 slidably accommodates the rear body element 13.

The key body element 12 is also generally conventional for a connector of the disclosed type, and extends from a first end 30 to a second end 31. Referring to FIGS. 3 to 6, inclusive, a forwardly positioned member 32 includes a radially projecting key 33. A rear cylindrically shaped member 34 defines a hollow bore 35 into which a separately machined key member 36 is press fitted to facilitate manufacture. The member 36 includes a longitudinally striated outer surface 37 to anchor member 36 against rotation relative to the hollow bore 35. An outer end rabbet 38 supports an anti-friction washer 39 (FIG. 1).

The rear body element 13 is interconnected by an interference fit to the forward body element 12, and includes a forward member 40 and a rear member 41. The forward member 40 defines a cylindrical sleeve 43, a forward part 44 of which is provided with radial ribs 45 which provide an interference fit relative to the hollow bore 35 in the body element 12. A medially disposed flange portion 47 serves to captivate the coupling sleeve element 11 onto key body element 12 and rear body element 13. A chamfered opening 48 leads to a rewardly extending sleeve 49 having an internally threaded bore 50. An outer surface 51 defines an annular crimping area beginning at a radial groove 52 and a radial abutment 53 for engagement with a cable engaging protective member 54, as is known in the art.

Referring to FIG. 2, the ferrule supporting body 14 is adapted to axially slide within the rear body element and key body element to which it is keyed. It includes a forward sleeve 60 defining a cylindrical bore 61 for the reception of the ferrule 15, and a rearwardly extending sleeve 62, a medially disposed flange 63 which engages the spring 17 which urges the body 14 leftwardly as seen in FIG. 1 to permit the free end of the ferrule to abut a corresponding ferrule with which it is engaged (not shown). Keying member 36 engages keyway 68 and prevents rotation of the ferrule supporting body with respect to the key body element.

The ferrule 15 is preferably formed of ceramic materials, as is well known in the art, and extends between an outer end 70 and an inner end 71. It defines a centrally disposed bore 72 for the reception of an optical fiber (not shown), in cemented relation well known in the art.

The wiper element 16 may be of resilient synthetic resinous materials, and includes an elongated hollow shank 80 and a head portion 81. The shank 80 includes an outer surface 82 having an annular projection 83 which engages a corresponding bead 84 on the ferrule body to lock it in position. A bore 85 includes an inner constricted end 86 which serves as the fiber guide and needle wipe due to the interference fit with the needle diameter and the resilient nature of the material utilized. The outer end 87 is chamfered to assist in the insertion of a syringe needle, fiber, and buffer.

The head portion 81 is bounded by an outer surface 88 and an inner end surface 89 from which the chamfered end 87 of the bore 85 extends. A radially, outwardly extending shoulder 95a provides for an interference fit with a through bore 95b of the ferrule supporting body which effects a seal to prevent injected epoxy into the cavity 95c from flowing out to external surfaces of the ferrule supporting body or wiping element.

The spring 17 is of conventional wire wound type, extending from a first end 94 to a second end 95.

Figure 15:
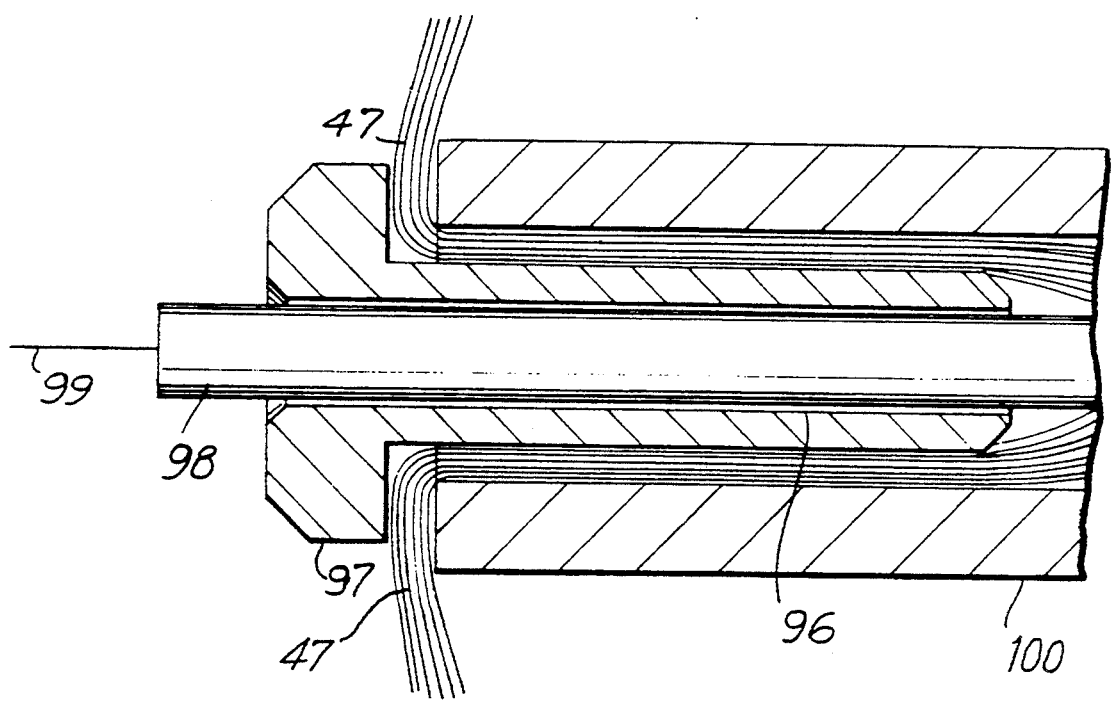
FIG. 15 is a fragmentary longitudinal sectional view corresponding to the central right hand position of FIG. 1, but showing a fiber optic cable and buffer protection tube in position.
Figure 16:
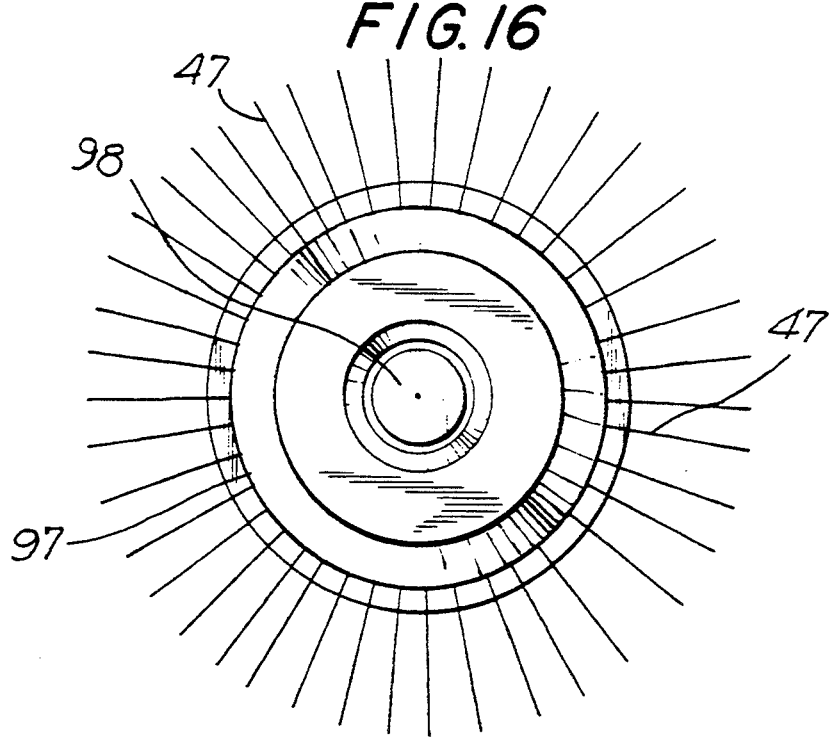
FIG. 16 is an end elevational view corresponding to the left hand portion of FIG. 15.

The buffer protective tube 19 may be formed as a screw machine product preferably from a hard material such as stainless steel. It includes a hollow shank 96 and an enlarged head 97. The position shown in FIG. 15 is obtained after the device has been inserted onto the prepared end of a fiber optic cable consisting of fiber 99, buffer 98, strength members 47, and outer jacket 100 by inserting the shank 96 about the buffer 98, and underlying the strength members 47 which are flared radially by the head 97 as seen, for example, in FIG. 16. In addition to the buffer protection function due to the resistance of the hard material to external pressure from the crimping operation, the head enables maintenance of a uniform distribution of the strands of the strength members which enhances the cable retention ability after crimping.

Turning now to the second embodiment of the invention (FIG. 6), to avoid needless repetition, parts corresponding to those of the first embodiment have been designated by similar reference characters with the additional prefix "2".

The second embodiment differs from the first embodiment principally in the provision of a deformable sleeve 101 positioned at an inner end of the rear body element 213, and the formation of the ferrule supporting body extension 219 which eliminates the need for a wiper element.

Another feature of the ferrule holder is the fact that in a free floating state (no external forces applied), the back of the holder extends beyond the back of the rear body of the connector. This feature has been designed to aide the process of "terminating" the connector. As epoxy is injected into the back of the ferrule of a prior art connector, some parts of epoxy may seep into other areas of the connector and harden; causing a defective product. The extended ferrule holder, as mentioned above, will act as a guide channeling any excess epoxy away from sensitive connector parts. Equally important is the fact that the holder will channel any excess epoxy out beyond the back end of the rear body to an area that is easy to clean by externally wiping clean.

The sleeve 101 is designed to be separately attached to the cable prior to connection with the connector, and includes a forward cylindrical member 102 and a rear cylindrical member 103. It is of metallic deformable material, such as aluminum. The rear body element 213 includes a stub-like sleeve 104 to receive the sleeve 101. Referring to the sleeve 101, an outer surface 105 includes a raised bead 106 which provides material for deformation into a corresponding recess 107 on the outer surface of the sleeve 104. The sleeve 104 is preferably knurled on its outer surface 105, so that when deformation occurs, the sleeve 101 is anchored not only against axial movement by virtue of the raised bead being collapsed radially or hexagonally inwardly into recess 107, but relative rotational movement as well. A thickened wall portion 109 defines a downward taper 110 for communication to the cylindrical section 110a and subsequently to cylindrical member 103. The member 103 is bounded by a stepped outer surface 111 providing a bead for a crimping tool (not shown), such that when crimped (deformed), the threaded inner bore 114 collapses inwardly to grip and retain the cable jacket and strength members. The inner bore contains a buffer protecting tube 19 as described above. The strength members are uniformly radially dispersed by the head of the buffer protective tube and are folded back in known manner prior to insertion (see FIGS. 15 and 16).

Turning now to the third embodiment of the invention, generally indicated by reference character 120 (see FIG. 7), parts corresponding to those of the first embodiment have been designated by similar reference characters with the additional prefix "3".

Figure 7:
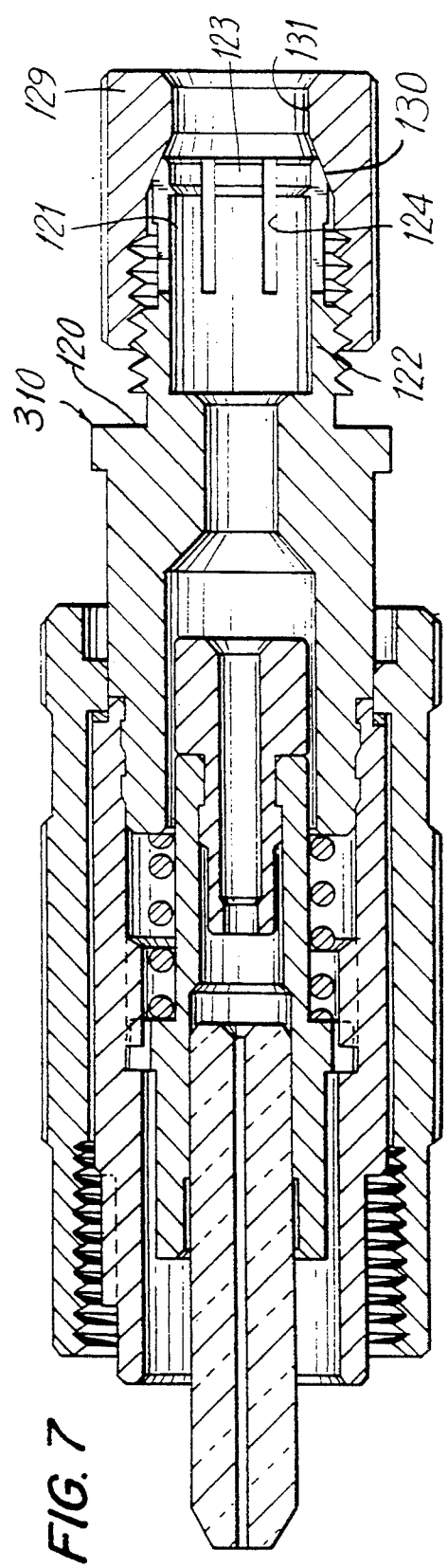
FIG. 7 is a longitudinal central sectional view of a third embodiment of the invention.
Figure 8:
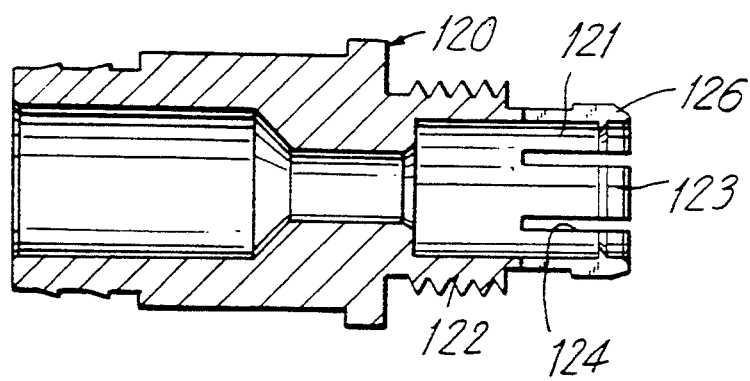
FIG. 8 is a longitudinal central sectional view of a rear body element comprising a part of the third embodiment.
Figure 9:
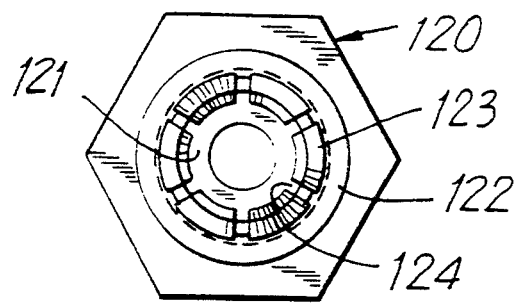
FIG. 9 is an end elevational view thereof.
Figure 10:
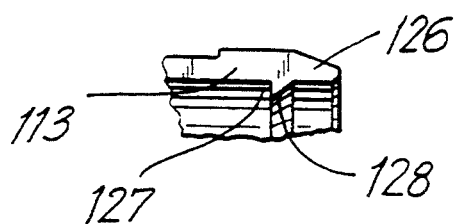
FIG. 10 is a fragmentary enlarged elevational view corresponding to the upper right-hand portion of FIG. 8.

The third embodiment differs from the first embodiment principally in the provision of a collet-like clamp 121 for engaging the jacket and strength members of the engaged cable. The clamp includes a threaded sleeve 122 forming deformable collet-like fingers 123 between separating slots 124. As best seen in FIG. 10, the tapered ends 126 of the fingers 113 include an arcuate undersurface 127 from which project thin backwardly tapered projections 128. When engaged by a camming nut 129 and tightened, the undersurfaces 127 are contracted due to downward pressure of tapered ends and corresponding inward movement of the projections 128 which grip the strength members and jacket and, hence, clench the cable without placing undue constrictive forces on the buffer as disposed radially inwardly thereof. The camming nut 129 is so configured, as best seen in FIG. 7, that the internal camming surface 130 exerts only limited contractile effect, excess tightening resulting only in the tips of the fingers deforming until separating slots 124 close to the point where the fingers touch one another, thus stopping further contraction.

Figure 11:
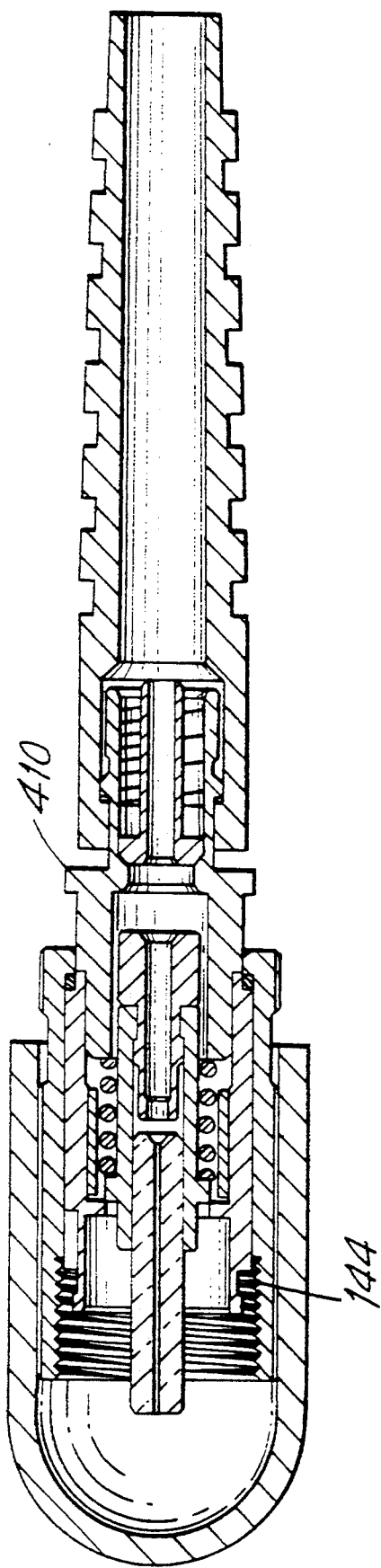
FIG. 11 is a central longitudinal sectional view of a fourth embodiment of the invention.
Figure 14:
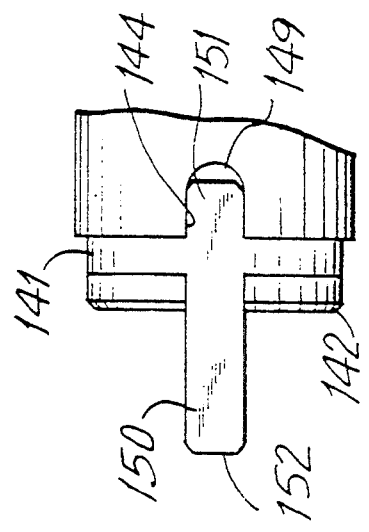
FIG. 14 is a similar view showing the external key element of FIG. 12 in engaged condition.
Figure 13:
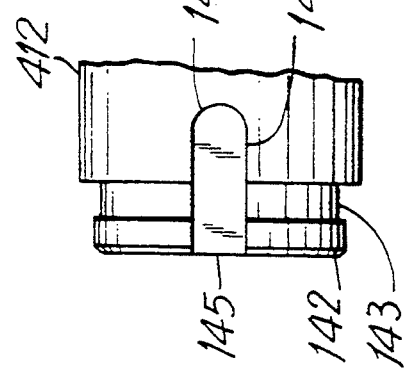
FIG. 13 is an enlarged fragmentary view corresponding to the left-hand portion of FIG. 11.

Turning now to the fourth embodiment of the invention 410 (FIG. 11) parts corresponding to those of the first embodiment have been designated by similar reference characters with the additional prefix "4", thereby avoiding needless repetition.

Figure 12:
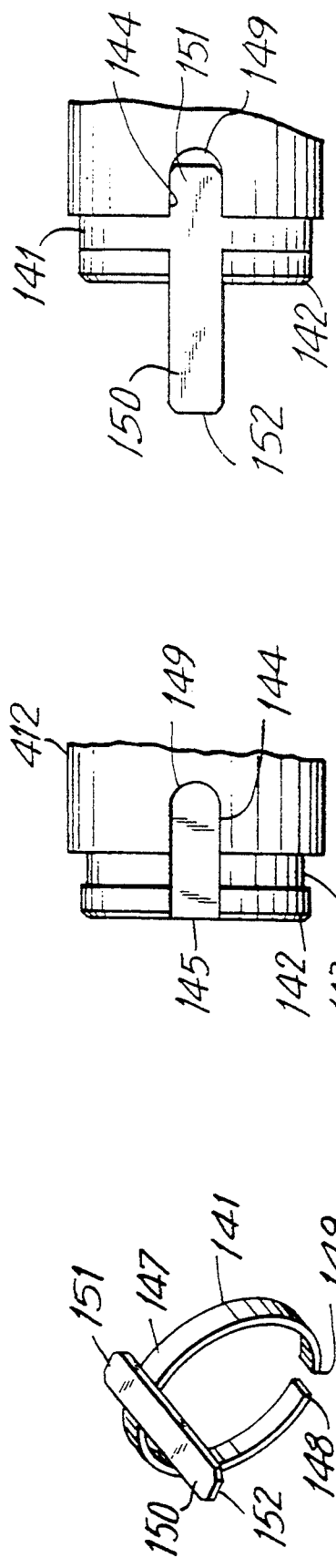
FIG. 12 is a view in perspective of an external key element forming part of the fourth embodiment.

The fourth embodiment is generally similar to the above disclosed embodiments, but is in the form of a so-called "D4" connector characterized in the presence of an external key element 141 (FIG. 12) which mates with a corresponding keyway element in an adapter (not shown) with which it is engageable. It will be noted that the key element 141 projects forwardly a substantial distance, so as to lie in the area of the finished end of the ferrule, thus providing a degree of interference when the terminated fiber is polished in a manner known in the art. In the present embodiment, this problem is eliminated by making the key element detachable to permit proper polishing, and then replacing it to its original orientation.

To accomplish this, the forward end 142 of the forward body 412 is provided with an annular groove 143 which communicates with a longitudinal groove 144 terminating in an end surface 145. The key element 141 is similarly configured, to include an annular member 147 having split ends 148 and 149 to permit the same to be expanded for removal and replacement. The longitudinal member 150 terminates in an inner end 151 and an outer end 152. The key element 141 is simply removed by inserting a tool between the ends 148 and 149. When the polishing operation has been completed, a similar engagement permits replacement of the key element in its original axial and rotational orientation.

We wish it to be understood that we do not consider the invention to be limited to the precise details of structure shown and set forth in the specification, for obvious modifications will occur to those skilled in the art to which the invention pertains.

We claim:

1. In a fiber optic connector having a rear body including means for engaging the sheath of a fiber optic cable, the improvement comprising: said rear body having a rearwardly projecting sleeve having an outer surface, said outer surface defining an annular recessed area and raised knurl sections on both sides of said annular recessed area and a separate crimp body including first and second tubular segments, said first segment including a medially positioned annular ring adapted to overlie said annular recessed area of said sleeve, and upon the occurrence of a crimping operation to be deformed to fill said area and to make intimate contact with said knurl sections, and anchor said crimp body against relative rotational and longitudinal movement relative to said sleeve; said second crimpable portion defining a bore for the reception of a sheath of an engaged fiber optic cable, and being radially or hexagonally crimpable to engage said sheath.

2. In a fiber optic cable connector of a type including a ferrule holder arranged for axial movement within a connector body, said ferrule holder defining a bore for the reception of a ferrule, and the adhesive interconnection of the ferrule within said ferrule holder, the improvement comprising means communicating with said bore and defining an interior bore produced utilizing resilient material and of diameter forming an interference fit with the outer surface of the needle of a syringe, and larger than that of a buffer of a fiber optic cable, whereby said bore provides a passage for the injection of an adhesive, and serves to wipe the needle of the syringe upon withdrawal therefrom prior to the insertion of said buffer.

3. In a fiber optic connector having a rear body including means for engaging the sheath and stranded strength members of a fiber optical cable, the improvement comprising: said means comprising a collet-like clamp having a hollow sleeve forming deformable fingers and separating slots between said fingers, the ends of said fingers including an undersurface having sharpened projections; a camming nut threadedly engaging said sleeve and contracting said fingers to a limited degree wherein the ends of said fingers contact each other, in which condition said projections grip said sheath and strength members to a degree that does not inhibit axial movement of a buffered fiber disposed within said sheath and strength members.

4. The method of making a hollow keyed body having a longitudinally extending bore and at least one key projecting radially inwardly within said bore comprising the steps of:

a) forming said hollow body to include a smooth longitudinal bore;

b) forming a second hollow cylindrical member of outer diameter forming a sliding fit relative to said first mentioned bore;

c) forming said at least one key on said second cylindrical member; and d) press fitting said second cylindrical member within said first cylindrical member to fixed relation therewith.

5. In the method set forth in claim 4, the additional step of forming longitudinally extending striations on at least one of said first and second cylindrical members to prevent relative rotational movement between said first and second members, after mutual engagement.

* * * * *